Aug. 16, 1966   H. J. PEIGNEN   3,266,701
CIRCUMFERENTIAL PIPE WELDING APPARATUS
Filed Oct. 19, 1964   4 Sheets-Sheet 3
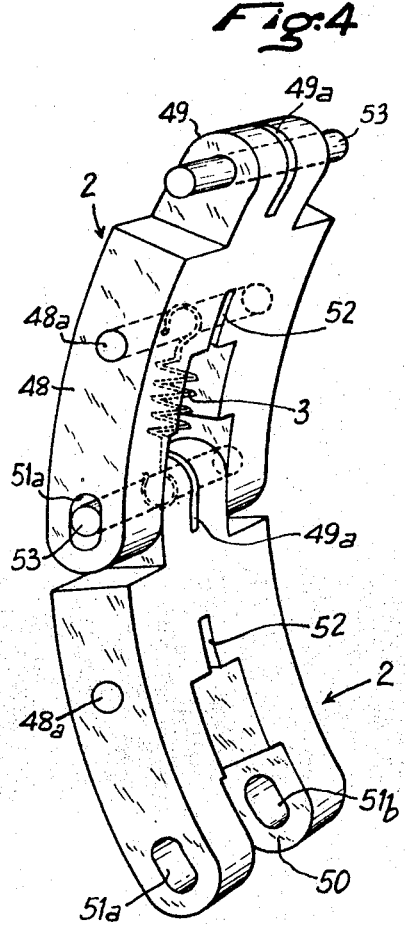
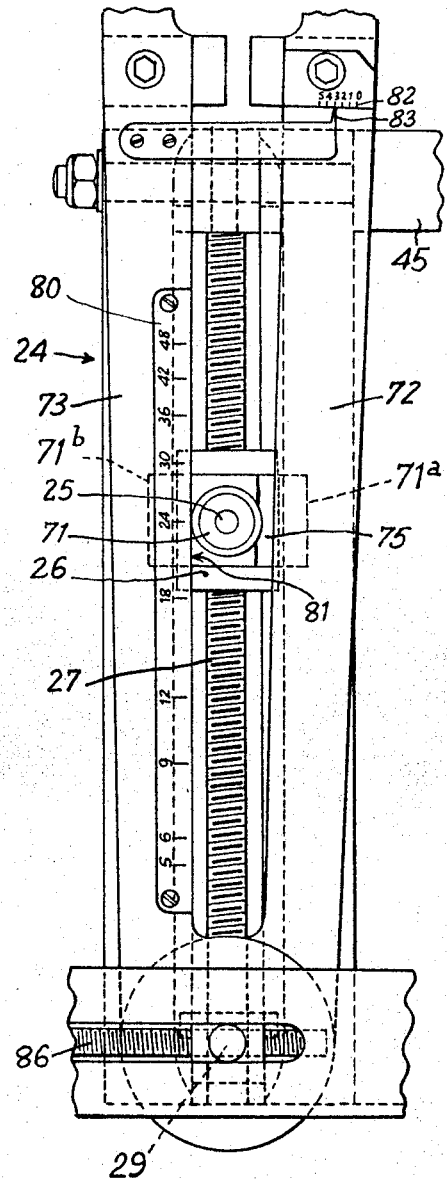
INVENTOR
HENRI JULES PEIGNEN
BY Edwin E. Greigg
ATTORNEY

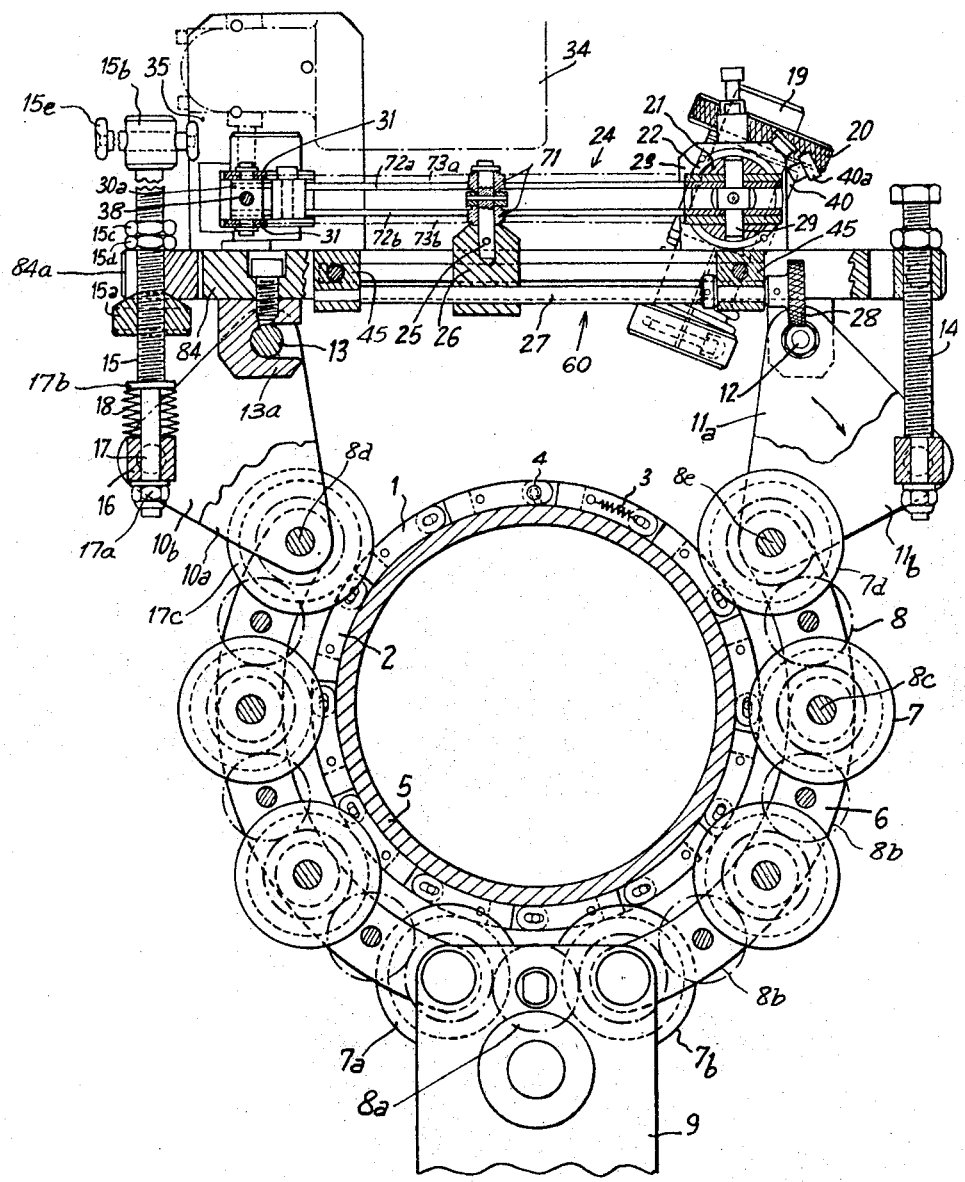

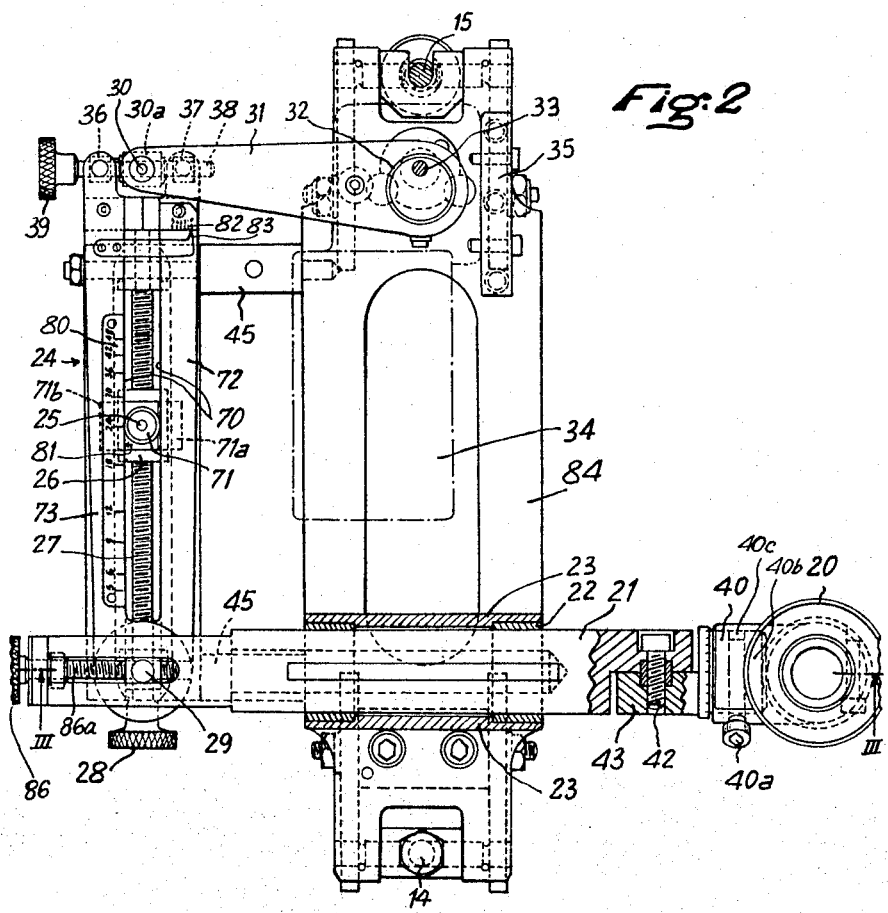
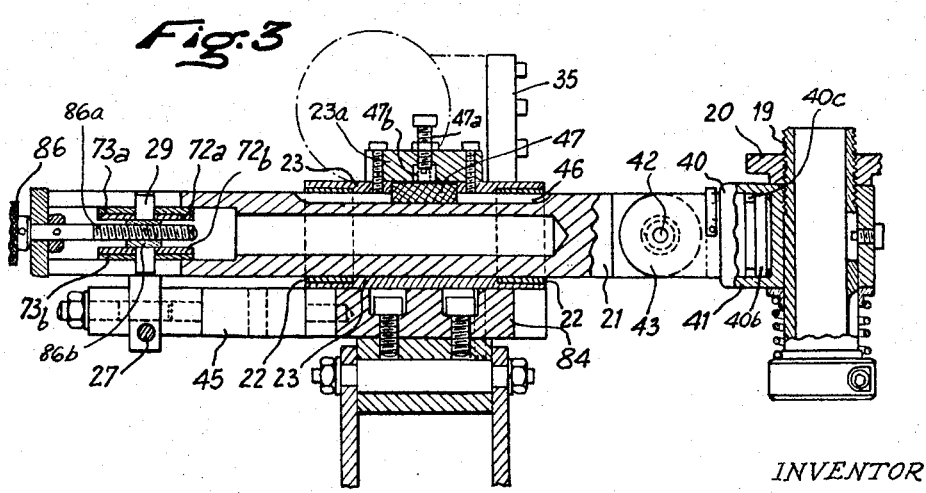

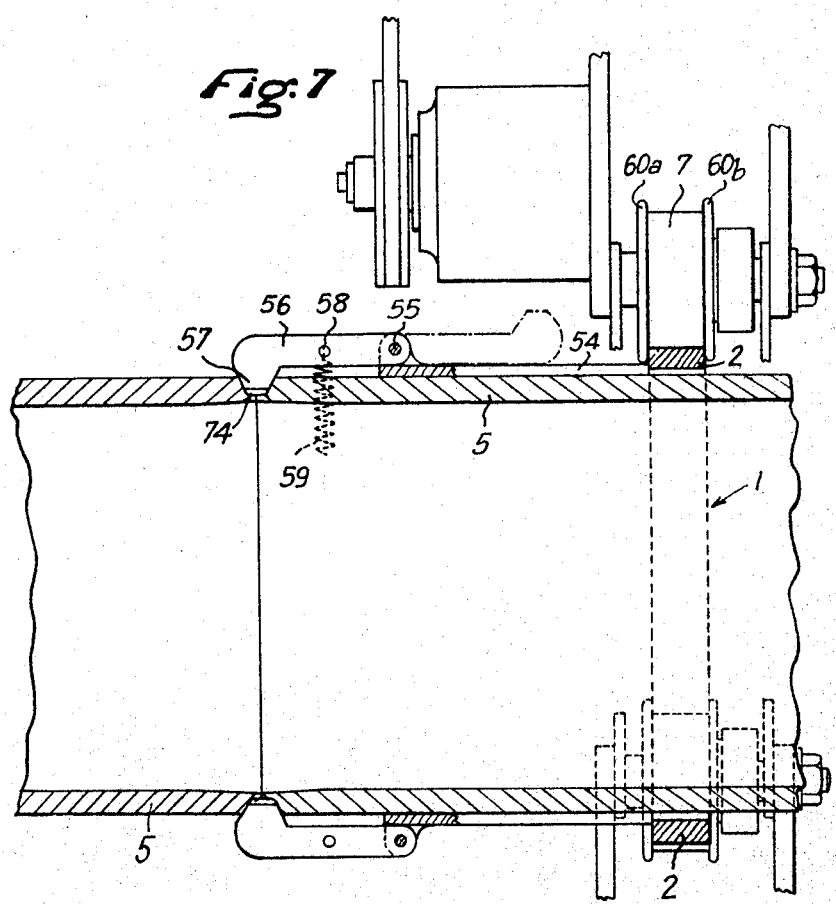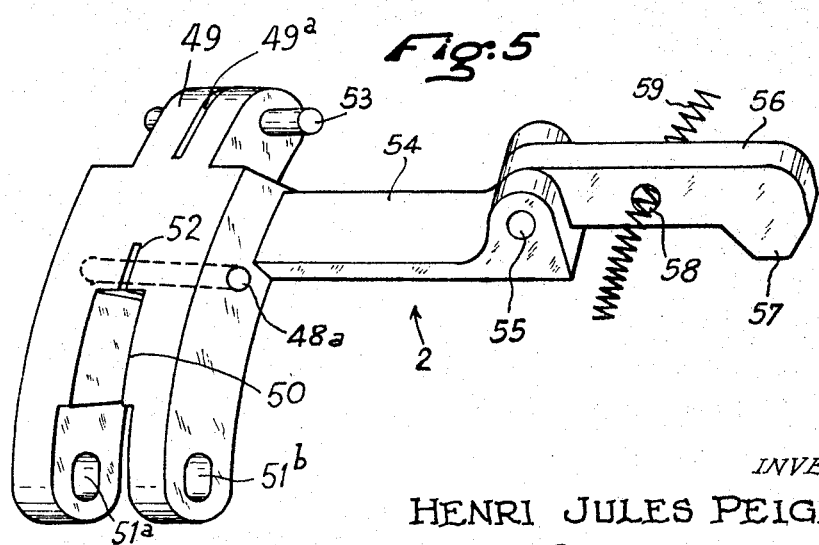

United States Patent Office 3,266,701
Patented August 16, 1966

3,266,701
CIRCUMFERENTIAL PIPE WELDING APPARATUS
Henri Jules, Peignen, Saint-Mande, France, assignor, by mesne assignments, to Biraghi (societe anonyme), Paris, France, a French joint-stock company
Filed Oct. 19, 1964, Ser. No. 404,675
Claims priority, application France, Oct. 25, 1963, 951,869
12 Claims. (Cl. 228—27)

This invention relates to a butt welding apparatus, particularly adapted to unit tube sections, for example, in the construction of pipe lines. The tube sections to be welded together have chamfered end portions which, after two sections are positioned in an end-to-end abutting relationship, form a groove therebetween for reception of the weld.

The welding operation itself is carried out in several steps. First, the two lips constituting the bottom of the chamfers are welded together by means of a refractory electrode. Thereafter, the groove is entirely filled with an autogenous welding torch preferably fed automatically fusible wire. This torch, in addition to its travel along and with respect to the groove, preferably also performs a zig-zag motion of variable amplitude parallel to the tube axis. Also, it is desirable that the torch during the course of its zig-zag motion briefly pause at each extreme position of its oscillation.

A number of systems have been designed for supporting and guiding the welding torch in its travel along the weld path or groove. Each design, however, necessitates complicated adjusting and control means for maintaining the torch exactly in the plane of welding.

It is, therefore, an object of the invention to provide an improved butt welding apparatus having a simplified mechanism for guiding the welding torch along the weld groove formed by a pair of tube sections to be welded together and juxtapositioned in an axial abutting relationship.

It is a further object of the invention to provide an improved butt welding apparatus having a novel and simplified mechanism to guide the welding torch in a zig-zag path over the weld groove as it is advanced therealong.

Briefly stated, the apparatus, according to the invention, includes a torch support provided with novel torch control means, an arcuate yoke attached to said support and carrying a plurality of spaced rollers held in a plane parallel to that of the yoke, a roller track comprising a resiliently extendable brace carrying a track surface that cooperates with the rollers secured to the yoke and provide with means for setting the position of the brace from the groove, said means being pivotable and adapted to temporarily engage the weld groove prior to the start of the welding operation. The invention will be better understood and further objects and advantages will become more apparent from the ensuing detailed description taken in conjunction with the drawing, wherein:

FIG. 1 is a sectional elevational view of the welding apparatus secured to the tube and taken in a plane normal to the tube axis;
FIG. 2 is a top plan view of the torch support;
FIG. 3 is a sectional view along line III—III of FIG. 2;
FIGS. 4 and 5 are isometric views of the links forming the brace;
FIG. 6 is a fragmentary top view of some parts shown in FIG. 2 in a different position; and
FIG. 7 illustrates schematically the spacing of the brace on the tube from the weld groove and the position of some of the rollers on the roller track.

Referring now to FIG. 1 there is shown a brace 1 comprising a plurality of links 2 secured to each other by pivoting means and drawn together by spring means 3. The details of both means will be later described in detail in conjunction with FIG. 4.

The brace 1, which is locked around the tube 5 by means of a conventional securing means 4, constitutes a track for rollers 7 that are carried by a yoke 6. Arcuate yoke 6 comprises two identical half portions, one end of each being secured to a housing of a motor 9. Motor 9 is adapted to rotate a pinion 8a which, in turn, is drivingly connected to rollers 7a, 7b, which, as best shown in FIG. 1, are the first rollers on each half portion of yoke 6. In order to impart a unidirectional rotation to each of the rollers 7, which are carried by the yoke 6, there is interposed a pinion 8 between each adjacent roller 7 which is drivingly connected thereto. Preferably each half portion of yoke 6 is formed by a plurality of segments 8b pivotally held together by means of roller shaft 8c. To the free ends of the yoke 7, distal from motor 9, there is pivotally secured, by means of two bell-cranks each formed of a pair of triangular plates 10a, 10b and 11a, 11b a torch support frame 84. Each bell-crank, as best shown in FIG. 1, is preferably mounted on the shaft 8d, 8e of rollers 7c, 7d, respectively. The spaced bell-cranks 11a, 11b are pivotally connected to torch support frame 84 through a securing means 12 and an adjustable tightening means 14, while the opposite pair of bell-cranks 10a, 10b are connected to the frame 84 by means of a tightening bolt 15 and a stud 13. Tightening bolt 15 is provided with a dependent stem 17 which passes through a bore in a stud 16 fixedly secured to bell-cranks 10a, 10b and attached hereto by means of a nut 17a. The upper portion of bolt 15 is held by a bifurcated portion 84a of frame 84 and is secured thereagainst by locking nuts 15c and 15d. Stem 17 is provided with any suitable spring means 18 which are adapted to engage stud 16 and a flange 17b of stem 17. Stud 13 is integral with bell-cranks 10a and 10b and is adapted to engage a hook 13a which extends from the frame 84 and is rigidly secured thereto. The yoke 6 is tightened about brace 1 by means of bolt 15 as will be better understood as the description progresses.

Referring now to FIGS. 1 and 3, it is seen that the torch support means generally indicated at 60 comprises a cylindrical torch carrier 19 adapted to fixedly hold an autogenous welding torch (not shown). Carrier 19 is mounted through a threaded member 20 at one end of a slide member 21 which is adapted to reciprocate parallel to the axis 25 in a sleeve 23 having bronze bushings 22. Slide 21 is prevented from turning about its own axis by means of an inertia-type brake shoe 47 which is held in an elongated groove 46 of slide 21 and submitted to the force of the tightening screw means 47a through an interposed spring 47b. Screw means 47a is mounted on sleeve 23 by means of bracket 23a. The torch support 60 further comprises an arm 24 adapted to oscillate about a means providing a fulcrum 71 which is rigidly secured to an internally threaded support 26 movable along a threaded stem 27 which, in turn, is adapted to be actuated by a knurled knob 28. The arm 24 comprises two spaced arm portions 72, 73 which are pivotally joined together at one end by means of pin 29. The confronting or offstanding faces of these two arms 72, 73 form an elongated opening 70 in which there is disposed the fulcrum 71.

Each of the arm portions 72, 73 (see FIGS. 1, 2, 3 and 6) is formed of two parallel elements 72a, 72b and 73a, 73b, respectively, between which there are slidably engaged the lateral elongations 71a, 71b of fulcrum 71. At the free ends of the arm portions 72, 73 distal from pin 29 there are mounted two oppositely-threaded knobs 36 and 37 both joined together by screw means 38 that is controlled by a knurled knob 39. The arm portions 72, 73 are angularly adjustable with respect to one another by manually turning knob 39 for the purpose that will become apparent hereinafter.

Oscillating arm 24 is joined to one end of slide 21 distal from the torch carrier 19 by means of pin 29. The other end of the oscillating arm 24 is connected to a transverse pin 30 carried on crank arm 31 by means of a bearing member 30a which is mounted on screw 38. Crank arm 31 is provided at its other end with an eccentric 32 that pivots about shaft 33 that is actuated by a motor 34 mounted on plate 35. Pltae 35, in turn, is fixedly mounted on frame 84 of torch support 60.

As best seen in FIG. 3, threaded stem 27 is attached at its ends to blocks 45 which also are fixedly secured to frame 84. The position of slide 21 with respect to pivot 29 may be longitudinally adjusted by manually rotating knob 86, thereby turning the adjusting screw 86a which threadingly engages a follower 86b fixedly secured to pin 29.

The torch carrier 19 is held in the bore of a sleeve 40 which is secured to a cylindrical head 40b by means of a tightening screw 40a engaging an annular groove 40c provided in head 40b. It is apparent (especially when viewing FIG. 2) that a slight loosening of screw 40a will allow sleeve 40 to be rotated about head 40b and thus make possible any desired adjustment of the torch carrier 19 in the plane of welding. Integral with head 40b is an arm 43 which is secured to the slide 21 by means of a bolt 42. Arm 43 is angularly adjustable with respect to slide 21, thus allowing the torch carrier 19 to be angularly adjusted with respect to the plane of welding.

FIG. 4 shows details of the links that form the brace 1. Link 2 comprises a bifurcated body 48 having a curvature generally corresponding to the curvature of the tubes to be welded. One end of body 48 is also provided with a tenon 49 having a slot 49a. At the end distal from tenon 49 body 48 has a generally U-shaped cavity 50 the two opposed branches of which are provided with aligned elongated bores 51a and 51b. The bottom of the U-shaped cavity 50 is provided with a slot 52 that intersects a bore in which there is positioned a pin 48a. One end of a coil spring 3 extending through slot 52 is hooked around pin 48a. The other end of spring 3 extends through slot 49a and is hooked around a pin 53 disposed in elongated openings 51a and 51b. Pin 53 is carried by a bore in tenon 49 of the adjacent link. By virtue of spring 3, pin 53 is urged to assume an innermost position in elongated bore 53, thus causing the entire brace 1 to be contracted to the smallest possible diameter. Only the joint 4 of the two extreme links of brace 1 is rigid (schematically shown in FIG. 1).

Referring now to FIG. 5 it will be observed that some of the links (for example, every other link forming brace 1) carry elongated plate members 54 to which there is attached by means of pin 55 a finger 56 the end of which is provided with an offstanding enlargement 57. This enlargement 57 has a contour which corresponds to the groove formed by the two opposing chamfers of the juxtaposed tubes. Finger 56 is provided with a transverse hole 58 through which passes a spring 59 (only partially shown). This spring is adapted to pass through perforated areas of all fingers 56 and its ends may be joined together to form a circular yoke (not shown).

In FIG. 7 there is shown brace 1 which is composed of links 2 mounted around the tube 5. Links 2 serve as a circular track for roller 7 of the yoke 6. Fingers 56, the enlargement 57 of which rests in the groove 74, are interconnected by means of spring 59 (only partially shown). Integral with each roller 7 are circular flanges 60a, 60b that engage opposing sides of the circular track composed of links 2.

The mounting of the apparatus about tube 5 is carried out as follows:

Brace 1 is passed around tube 5 and is secured together at 4. The clamping effect produced by the tension of spring means 3 is sufficient to prevent an accidental displacement of brace 1 during its assembly operation. Fingers 56 are swung forward to their full line position so that the enlargements 57 engage in the groove 74. The ends (not shown) of spring 59, which has been previously passed through hole 58 of each finger 56, are now hooked together. Thus, it is seen by means of fingers 56 the brace 1 may be positioned at a predetermined spaced relation with respect to the plane of welding.

Next, the yoke 6 is passed about the brace 1 constituting the circular track. In this position the flanges 60a and 60b of rollers 7 laterally embrace links 2. With bolt 15 the free end 84 of the torch support 60 is now attached to stud 13 of the bell-cranks 10a, 10b. Thereafter, bolt 15 is swung into the forked opening 84a in frame 84 and is tightened manually by turning torquing lever 15e slidably received in a transverse bore of head 15b. During the tightening operation knurled nut 15a is manually held stationary against frame 84, the movement of which is further restricted by locking nuts 15c and 15d. In this tightening arrangement the spring means 18 compensate for the irregularities in the tube shape due to the tolerances of manufacturing. During the tightening operation force is exerted upon stud 16 whereby bell-cranks 10a, 10b are urged to pivot counterclockwise forcing stud 13 against the bottom of hook 13a of frame 84 on one hand and thus causing the tightening of yoke 6 around tube 5 on the other hand. By adjusting tensioning means 14 associated with bell-cranks 11a, 11b, it is possible to vary the diameter of the yoke 6, thus enabling the apparatus to be used for tubes of varying circumferential areas.

At this stage of the assembling operation, the yoke 6 is positioned at the desired distance from the plane of welding with this distance being predetermined by the length of plate 54 and fingers 56 (FIG. 7). The above-described tightening of the yoke prevents any displacement of brace 1. After the tightening of the yoke 6, the spacing fingers 56 are lifted against the force of spring means 59 and pivoted 180° backward to lie against plate 54 as best shown in broken lines in FIG. 7. The spring means 59 will now maintain the fingers 56 in this retracted position. The mounting operation, which may be carried out in about two minutes, is now terminated.

As a next step, the inclination of torch carrier 19 is adjusted with respect to the axis and to the plane of welding by means of pivoting arm 43 about loosened bolt 42 and turning sleeve 40 about head 40b.

Motor 34 is adapted to rotate the eccentric 32 thereby imparting a motion to crank arm 31. Arm 31, in turn, causes arm 24 to oscillate about the fulcrum 71, thus transmitting to slide 21 a to-and-fro sliding movement in the sleeve 23. The amplitude of the to-and-fro motion is determined by the position of fulcrum 71 which may be adjusted along arm 24 by means of knurled knob 28 operatively connected to threaded stem 27.

In instances where the arm portions 72, 73 are angularly adjusted with respect to each other in such a manner that they simultaneously engage fulcrum 71, slide 21 will be submitted to a non-stop to-and-fro motion. If, on the other hand, bolt 38, which joins together the portions 72, 73 distal from their pivotal joint 29, is adjusted by means of knurled knob 39 in such a manner that these arms define a certain clearance 75 between themselves and fulcrum 71, slide 21 will pause for a limited time interval at each extreme position of the crank arm 31 when it causes oscillating arm 24 to change its direction (FIG. 6).

The longitudinal adjustment of slide 21 by means of knurled knob 86 makes it possible to shift the axis of the torch carrier 19 with respect to the plane of welding.

This might become necessary should it be desirable that a welding pass is to be carried out on the edges of the chamfers.

It is inherent in the structure described above that the pause in the to-and-fro movement of slide 21, predetermined by the angular adjustment of arm portions 72, 73 by means of knurled knob 39, will be in proportion to the amplitude of motion of slide 21 as determined by the position of fulcrum 71 on threaded stem 27.

In order to facilitate the determination of the residual amplitude of the to-and-fro motion of the torch, one of the arm portions 72, 73 is provided with a graduated scale 80, while fulcrum 71 carries a pointer 81 (see FIGS. 2 and 6). Each graduation indicates the magnitude of the amplitude of the to-and-fro motion for each position of fulcrum 71 on threaded stem 27, in case no clearance exists between the arm portions and fulcrum 71 (the angle between the two arm portions 72, 73 being substantially zero). The arm portion 72 is provided with a scale 82 (FIGS. 2 and 6) which is associated with a pointer 83 fixedly secured to the opposite arm portion 73 and which is adapted to indicate the percentage in the reduction in amplitude of the to-and-fro movement corresponding to the given opening of the arm portions 72, 73.

Under these conditions the determination of the residual amplitude of the zig-zag motion of the torch is extremely simple. For example, if pointer 81 indicates a value of 20 mm. and pointer 83 a value of 10%, it can be found immediately that the actual amplitude will be $$20 - \frac{(20 \times 10)}{100} = 18 \text{ mm.}$$

It is also to be noted that the amount of 10% gives an exact indication of the amount of accumulation of the soldering material at the end of each zig-zag motion.

The above-described welding apparatus is of the type wherein the tube is held stationary and the apparatus itself travels about the tube. It will be apparent that if the apparatus is held stationary by a frame structure and the tube sections are of the rotatable type, the relative motion between the autogenous torch and the welding groove will be carried out by the rotation of the tube sections while the welding apparatus is maintained stationary. Such an arrangement may be materialized with minor adjustments of the above-described apparatus without departing from the scope of the invention.

In summary, the invention incorporates the following features which may be considered either jointly or separately, either in combination with each other or in combination with the features set forth hereinbefore:

(A) The torch support comprises on one hand a tiltable torch carrier secured to the extremity of an adjustable slide member having an axis perpendicular to the plane of a yoke, and on the other hand comprises an arm mounted in such a manner as to be adapted to oscillate about an axis parallel to the plane of the yoke and secured at one side to the end portion of the slide distal from the torch carrier, and on the other side secured to the end portion of an eccentric crank arm driven by a motor.

(B) In a structure according to A, the fulcrum about which the arm oscillates is mounted slidably and adjustably parallel to said arm.

(C) In a structure according to A, the actuation of the oscillating arm is carried out with a certain clearance so that the immobilization of the arm is realized at each extremity of the oscillating motion.

(D) The oscillating arm is made of two adjustable arm portions that form an elongated opening and further each portion is formed by two elongated elements between which there are slidably mounted the lateral prolongations of the fulcrum, whereas the fulcrum is adapted to slide in the opening when the arm portions are at an angle with respect to each other and said fulcrum is adapted to be engaged simultaneously by both arm portions when they are adjusted at an angle of substantially zero.

(E) In a structure according to D, the edges of the arm portions are parallel in their closest position at which time they simultaneously engage the opposed sides of said fulcrum.

(F) The yoke is made of a plurality of segments pivotally secured to each other by the shaft members of the aforementioned rollers.

(G) Means for transmitting the rotation to the rollers are mounted between each roller where the motor fixedly mounted on two of the yoke segments is operatively connected to at least one adjacent roller by means of driving means.

(H) The torch support is disposed between the two free ends of the yoke and is provided with locking means for securing it to the yoke.

(I) The expandable brace comprises a plurality of rigid arcuate links, the curvature of which follows that of the tubes to be welded.

(J) Each brace link is secured to the adjacent link by a connecting means comprising a pin secured to one of the links and pivotally mounted in an opening in the other, which opening is of an elongated shape in the length dimension of the link and further there is provided a resilient means which pulls the links together so that the brace assumes a minimum diameter.

(K) The retractable means for setting the position of the brace comprises a plurality of fingers having at their ends an enlargement corresponding to the dimensions of the circumferential groove formed by positioning the chamfered tubes in an abutting relationship, the enlargement on said fingers is adapted to be engaged by said groove, each finger being pivotally attached to a plate integral with one link of said brace in such a manner that it may be retracted in the direction of the brace, and further said fingers are provided with resilient means urging them toward the bottom of the groove or towards the brace.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

What I claim is:

1. An apparatus for the butt welding of axially juxtaposed tube sections along a weld path comprising:
    (A) elastically extensible brace means circumferentially mounted about one of said sections and comprising a plurality of links pivotally and elastically extensibly secured together to form a circumferential roller track;
    (B) yoke means surrounding said brace means;
    (C) powered means carried by said yoke means and adapted to engage said roller track of said brace means;
    (D) motor means for operating said powered means to cause a continuous relative motion between said apparatus and said weld path;
    (E) torch support means; and
    (F) securing means for attaching said yoke means to said torch support means.

2. An apparatus as defined in claim 1, wherein said path is formed by a groove, at least one of said links is provided with an integral, elongated plate extending substantially normal to the plane of said brace means, an elongated finger pivotally attached to said plate, said finger having an enlargement adapted to engage said groove for setting the distance between said groove and said brace, said finger being adapted to be swung away from said groove into a retracted position.

3. An apparatus as defined in claim 2, including spring means to urge each of said fingers against said groove when said enlargement is in an engaging relation therewith.

4. An apparatus as defined in claim 2, including means to urge each of said fingers into its retracted position.

5. An apparatus as defined in claim 2, including a helical spring circumferentially surrounding one of said tube sections and urging each of said fingers against said groove when said enlargement is in engagement therewith and to urge each of said fingers into said retracted position when swung away from said groove.

6. An apparatus for the butt welding of axially juxtaposed tube sections along a weld path comprising:
   (A) brace means circumferentially mounted about one of said sections and including a circumferential roller track;
   (B) yoke means surrounding said brace means;
   (C) a plurality of driven rollers spacedly and rotatably mounted in said yoke means in a substantially common plane and adapted to engage said roller track of said brace means;
   (D) interposed means positioned between adjacent rollers for transmitting a unidirectional rotary movement to each of said rollers;
   (E) motor means drivingly connected to said driven rollers to cause a continuous relative motion between said apparatus and said weld path;
   (F) torch support means; and
   (G) securing means for attaching said yoke means to said torch support means.

7. An apparatus as defined in claim 6 wherein said interposed means comprises a plurality of pinions one of each interposed between and drivingly connected to adjacent rollers.

8. An apparatus according to claim 6, wherein each roller is provided with a shaft, said yoke means comprising a plurality of links pivotally connected to each other by means of said shaft.

9. A welding apparatus of the type including means for advancing the said apparatus along a weld path, torch carrier means adapted to fixedly hold a welding torch, means for imparting a zig-zag motion to said torch carrier means transverse to said weld path, said means for imparting said zig-zag motion comprises:
   (A) a support frame;
   (B) motor means secured to said frame;
   (C) a crank arm driven by said motor means;
   (D) fulcrum means attached to said frame;
   (E) an oscillating arm operatively connected to said crank arm and adapted to oscillate about said fulcrum; and
   (F) a slide member operatively attached to said oscillating arm and adapted to perform a to-and-fro motion in said frame and means for securing said torch carrier to said slide.

10. An apparatus as defined in claim 9, wherein said fulcrum means comprises:
   (A) a stem secured to said frame and positioned along said oscillating arm;
   (B) a fulcrum mounted on said stem and adapted to engage said oscillating arm; and
   (C) means for shifting the position of said fulcrum along said stem for varying the amplitude of the oscillating motion of said oscillating arm at its connecting point with said slide member.

11. An apparatus as defined in claim 9, wherein said oscillating arm comprises two elongated arm portions pivotally attached together at one end and extending in the same general direction toward said crank arm and secured thereto, said fulcrum positioned between said arm portions and adapted to be alternately engaged thereby when actuated by said crank arm, means for pivotally connecting said arm portions to said slide member at said pivoted end and means for varying the distance between said arm portions measured across said fulcrum.

12. An apparatus as defined in claim 9, wherein said oscillating arm comprises two elongated arm portions extending side by side in the same general direction and secured together in at least two locations along their length, one end of said oscillating arm connected to said crank arm and the other end of said oscillating arm connected to said slide member, said fulcrum positioned between said arm portions and adapted to be alternately engaged thereby when actuated by said crank arm and means for varying the distance between said arm portions measured across said fulcrum.

References Cited by the Examiner
UNITED STATES PATENTS

| 1,424,171 | 8/1922 | Lee | 228—35 |
| 3,135,850 | 6/1964 | Scheller et al. | 219—60.1 |
| 3,176,897 | 4/1965 | Tucker | 228—60.1 |
| 3,179,781 | 4/1965 | Ross et al. | 219—60.1 |

FOREIGN PATENTS

| 944,451 | 12/1963 | Great Britain. |

JOHN F. CAMPBELL, *Primary Examiner.*

WHITMORE A. WILTZ, *Examiner.*

M. L. FAIGUS, *Assistant Examiner.*